(12) United States Patent
Carter (10) Patent No.: US 7,307,914 B1
(45) Date of Patent: Dec. 11, 2007

(54) HYPOTHESIZED RANGE AND DEPTH SONAR PROCESSING METHOD

(75) Inventor: G. Clifford Carter, Waterford, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 156 days.

(21) Appl. No.: 11/296,712

(22) Filed: Nov. 30, 2005

(51) Int. Cl.
*G01S 3/80* (2006.01)
(52) U.S. Cl. .................................... 367/118
(58) Field of Classification Search ........... 367/118, 367/125
See application file for complete search history.

(56) References Cited

U.S. PATENT DOCUMENTS

| | | | | |
|---|---|---|---|---|
| 4,312,053 A * | 1/1982 | Lipsky | ...................... | 367/127 |
| 5,357,484 A * | 10/1994 | Bates et al. | .................. | 367/118 |
| 5,420,827 A * | 5/1995 | Feintuch | ..................... | 367/127 |
| 5,455,806 A * | 10/1995 | Hutson | ........................ | 367/100 |
| 5,481,505 A * | 1/1996 | Donald et al. | ............. | 367/118 |
| 5,559,755 A * | 9/1996 | Beam | ......................... | 367/118 |
| 5,914,912 A * | 6/1999 | Yang | .......................... | 367/119 |
| 6,009,045 A * | 12/1999 | Yang et al. | ................. | 367/119 |
| 6,096,085 A * | 8/2000 | Sammelman | ................. | 703/2 |
| 6,466,891 B1 * | 10/2002 | Carter et al. | ................. | 367/99 |
| 6,822,928 B1 * | 11/2004 | Carter et al. | ................ | 367/119 |
| 2005/0278158 A1 * | 12/2005 | Ellison et al. | ................ | 703/6 |

* cited by examiner

*Primary Examiner*—Dan Pihulic
(74) *Attorney, Agent, or Firm*—James M. Kasischke; Michael P. Stanley; Jean-Paul A. Nasser (57) ABSTRACT

A method for determining the likely range and depth of an acoustically radiating source in which characteristics are used from hypothetical ranges and depths. A received sonar signal is compared with modeled ranges and depths. The correlation between the received signal characteristics and the modeled characteristics gives the likely range and depth. In a preferred embodiment this is presented as a contour plot.

13 Claims, 5 Drawing Sheets

HYPOTHESIZED RANGE AND DEPTH SONAR PROCESSING METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to sonar processing and, more particularly, to a post processing method for estimating range and depth for one or more acoustically radiating sources by correlation processing between the passively received signal and an environmentally modeled signal.

(2) Description of the Prior Art

Many traditional sonar systems provide only an estimation of the bearing from a platform to one or more radiating underwater acoustic sources of interest. It would be advantageous to obtain range and depth information to the one or more acoustic sources of interest. If for no other reason, the performance of a sonar system can be enhanced by rapid estimation of range and depth to a radiating underwater acoustic source. Prior art techniques for obtaining range and depth are discussed below and may typically require knowledge about the depth of the source or involve the use of vertical sensor arrays with beamforming techniques, or variable depth sonars, or the like.

The following U.S. patents describe various prior art systems that may be related to the above and/or other telemetry systems:

U.S. Pat. No. 4,312,053, issued Jan. 19, 1982, to Lipsky, discloses a method and apparatus for computing the range to and depth of a submerged object that either emits or reflects pulses of acoustic energy, wherein a detecting array and related data handling apparatus measure as a function of time the apparent angles of arrival of the acoustic energy associated with each such pulse. This data is then translated into actual multipath arrival angles and multipath travel time differences which are utilized to solve mathematical equations, the solutions of which result in the calculation of the range to and depth of the submerged source of acoustic energy.

U.S. Pat. No. 5,420,827, issued May 30, 1995, to Feintuch, discloses a variable depth sonar which is adapted to provide passive multipath target ranging and depth estimates. The sonar employs a novel estimation procedure which is adapted to sonars with relatively small sensors and limited computing power. A novel feature of the invention is the introduction of a change of depth of the sonar receiver, mounted on a mobile platform, into the estimation process. Measurements at the two different depths are combined to provide target range and depth. Other features and improvements are disclosed.

U.S. Pat. No. 5,455,806, issued Oct. 3, 1995, to Hutson, discloses a multi-dimensional acoustic data processing and display system that arranges acoustic data in a three-dimensional matrix. The three-dimensional matrix is compressed using singular value decomposition into singular vectors and singular values. A historical database is created and maintained and is also concatenated with the three-dimensional data. This database allows reverberation and noise to be diminished and other, weaker features in the data to be enhanced. Once the data is compressed, the data can be analyzed efficiently. The singular vectors are partitioned into one or more groups on the basis of their singular values or other criteria. Certain of the compressed data elements are enhanced or diminished by modifying the singular values within each of the groups of singular vectors. Selected singular vectors are processed further by other techniques for further enhancement, detection, isolation, feature extraction and classification. The compressed and enhanced data is then expanded back into three-dimensional form for display or for other processing.

U.S. Pat. No. 5,481,505, issued Jan. 2, 1996, to Donald et al, discloses a method and apparatus for detecting, processing and tracking sonar signals to provide bearing, range and depth information that locates an object in three-dimensional underwater space. An "inverse beamformer" utilizes signals from a towed horizontal array of hydrophones to estimate a bearing to a possible object. A "matched field processor" receives measured covariance matrix data based upon signals from the hydrophones and signals from a propagation model. An eight nearest neighbor peak picker provides plane wave peaks in response to output beam levels from the matched processor. A five-dimensional M of N tracker identifies peaks within the specified limit of frequency, bearing change over time, range and depth to specify an object as a target and to display its relative range and depth with respect to the array of hydrophones.

U.S. Pat. No. 5,914,912, issued Jun. 22, 1999, to Yang, discloses a sonar array post processor that employs an adaptive processing, known as matched beam processing, in the beam domain which takes analog or digital conventional beamforming outputs from a sonar array, multiplies them by a set of adaptive weighting coefficients and produces a new set of beams. The new output beam of highest intensity yields the ideal maximum signal gain and correct target bearing. Continuous target tracking provided by the sonar array post processor in the endfire direction of a horizontal line array minimizes the towing ships maneuvers and for, a bottom mounted surveillance system, a smaller number of arrays are required.

U.S. Pat. No. 6,009,045, issued Dec. 28, 1999, to Yang et al, discloses an advanced vertical array beamformer signal processor that accomplishes acoustic beamforming of an underwater vertical array used in shallow water utilizing matched beam processing to suppress generated noise and/or ship radiated noise thereby increasing the detectability of a submerged source emitting only a low noise signal. The processor exploits the difference of the signal arrival angle of both active and passive signals with that of the wind generated noise and ship radiated noise which is prominent in downward refractive sound speed profiles. After filtering the undesired noise, the processor uses the depth of the source as a clue for detection; the processor is an energy detector focused on the returns of a deep source.

U.S. Pat. No. 6,096,085, issued Aug. 1, 2000, to Sammelman, discloses a computer-readable software stored on a storage medium and executed on a computer to perform an integrated sonar simulation, including a parameter definition code for defining a plurality of parameters of a sonar, target and sonar environment, and a SNR computation code for computing a SNR of the sonar as a function of range to target, based upon the parameters defined by the parameter definition code. The parameters defined by the parameter definition code include ambient noise, volume scattering strength of the sonar environment, sound velocity profile of the sonar, beam patterns of both projector and receiver of the sonar, type of sonar, range resolution of the sonar, number of eigenrays striking the surface and bottom of the sonar environment, number of eigenrays striking the target, ray trajectories to the target, and surface and bottom scattering strength as a function of angle. The software also includes a target strength model generating code for computing scattering from a selected complex target of a stored set of complex target selections, to thereby generate a target strength model for the selected complex target.

U.S. Pat. No. 6,466,891, issued to Carter et al. on Oct. 15, 2002 provides a system that provides a sonar operator with the most likely range to a target of interest. The system generates and displays a contour based on ship's parameters, target parameters, environmental data, and operator parameters. The sonar operator can vary many of the parameters in "what if" scenarios so as to generate groups of contours for preselected probabilities of detection. Contours can be used to show the actions that should be taken to ensure a favorable outcome.

The above cited prior art does not disclose a system which is not limited to vertical arrays, or tracking and beamforming, or which is not an active sonar system, which is operable for determining range and depth. Consequently, those skilled in the art will appreciate the present invention that addresses the above and other problems.

SUMMARY OF THE INVENTION

It is a general purpose of the present invention to provide an improved sonar system.

An object of the present invention is to rapidly estimate range and depth to an acoustic source at a selected bearing of interest.

Another object of the present invention is an improved method of processing sonar information.

Yet another object is to estimate a range and depth for an underwater acoustic radiating source.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention provides a method for estimating an unknown range and an unknown depth of an underwater acoustically radiating source. The method may comprise one or more steps such as, for instance, calculating an environmentally modeled acoustic signal positioned at one or more hypothetical ranges and depths, passively receiving a sonar signal, and/or post processing the passively received sonar signal by correlating the passively received sonar signal with the environmentally modeled acoustic signal. The step of calculating the environmentally modeled acoustic signal may further comprise utilizing measured ocean depth information, measured ocean floor slope information, and measured sound velocity profile information for computing a plurality of ray traces for a matrix of hypothesized depths and ranges.

The method may further comprise determining an output of the step of post processing as a function of range and depth and/or may further comprise producing autocorrelation peaks and combining the autocorrelation peaks to produce a graph of acoustic power with respect to range and depth. The method may further comprise assuming a depth of the underwater acoustically radiating source for resolving an uncertainty.

In another possible embodiment, the method may comprise producing an autocorrelation function from a beam output from an acoustic array produced by a sonar signal. Other steps may comprise producing a weighting function based on a matrix of hypothesized depths and ranges for the underwater acoustically radiating source using measured water depth and measured sound velocity profile information. The method may further comprise combining the autocorrelation function and the weighting function into one acoustic power measure that is suitable for display in terms of range and depth.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

In a preferred embodiment, the post processing method of the present invention extracts depth and range estimates from autocorrelation (or cepstrum) functions. The method provides a sonar system with a rapid, i.e., computationally efficient, method for passively estimating range and depth to an underwater acoustic source. This embodiment of the method provides a relatively easy-to-implement technique which is intended to provide a maximum likelihood method of mapping autocorrelation (or cepstrum) peaks into target range and depth estimates.

The method comprises hypothesizing a range and depth, predicting peaks in the autocorrelation function based on ray tracing or normal mode calculations with measured sound velocity profile data, and then combining the predicted peaks into one power measure that may be displayed in terms of range and depth. The present invention utilizes post processing to exploit the robustness of correlation processing between the passively received signal and the environmentally modeled signal in order to accurately estimate acoustic contact (target) position. In accord with one preferred embodiment of the invention, an autocorrelation (or cepstrum) function A(τ) is computed, squared, weighted, and integrated. There is a slight technical difference between "square" and "magnitude-squared." The proposed method could use either the A function, or the A squared function or the A magnitude squared function. In the preferred embodiment A magnitude squared function is envisioned. However, there are cases where either A or A squared functions might offer improved performance in terms of achieving the desired result.

Figure 1:
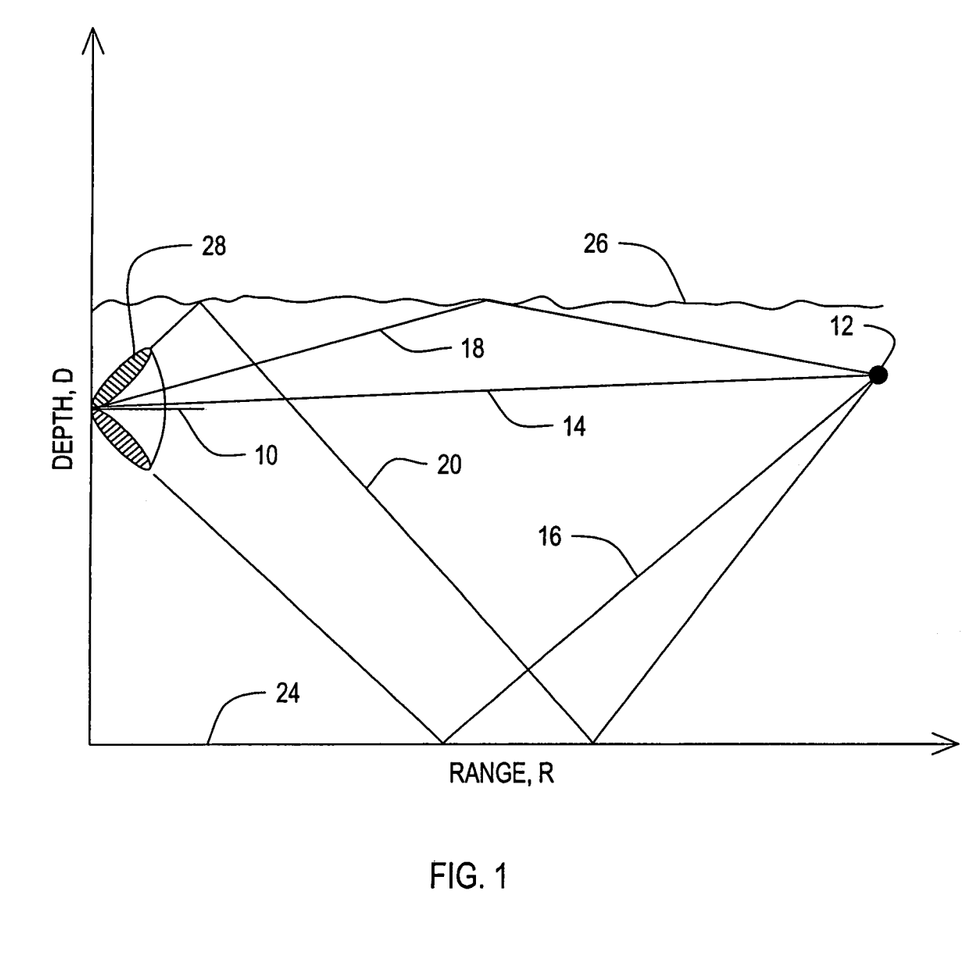
FIG. 1 is a schematic showing acoustic signal paths where a source radiates energy along multiple paths which are received by a submerged sonar receiving array.

FIG. 1 shows a diagram of acoustic paths in an aquatic environment having depth, D, and range, R. A sonar receiving array 10 receives acoustic signals from a source 12 along multiple paths 14, 16, 18, 20 and 22. These paths can be direct such as path 14, involve bounces off bottom 24 such as path 16, bounces off of surface 26 such as path 18 and multiple bounces such as path 20. Sonar receiving array 10 can be a towed array or other sonar sensor array known in the art having a steerable beam pattern 28. The different path lengths 14, 16, 18, and 20 result in different arrival times, τ, for the acoustic energy.

The output of the sonar receiving array 10 can be beamformed to give the bearing to the source 12; however, the range, R, and depth, D, are still unknown. The beam output is then processed to achieve a squared autocorrelation (or cepstrum) function, $A(\tau)^2$, such as function 30 sketched in FIG. 2. In function 30, peaks 32A, 32B, 32C, 32D, 32E and 32F represent the acoustic power arriving at different times, τ. These peaks 32A-F correspond to signals received on different paths such as those shown in FIG. 1.

Utilizing the technique of the present invention, a range, R and depth, D to some hypothetical source is used as a hypothetical range. Environmental characteristics such as sound velocity profile (SVP), depth, and bottom type are obtained. For each hypothetical range, R, and depth, D, the method then calculates locations of hypothetical peaks from these measured environmental characteristics by ray tracing. Peaks are calculated based on transmission from source 12 along a set of probable paths such as those shown at 14, 16, 18, 20 and 22.

Figure 2:
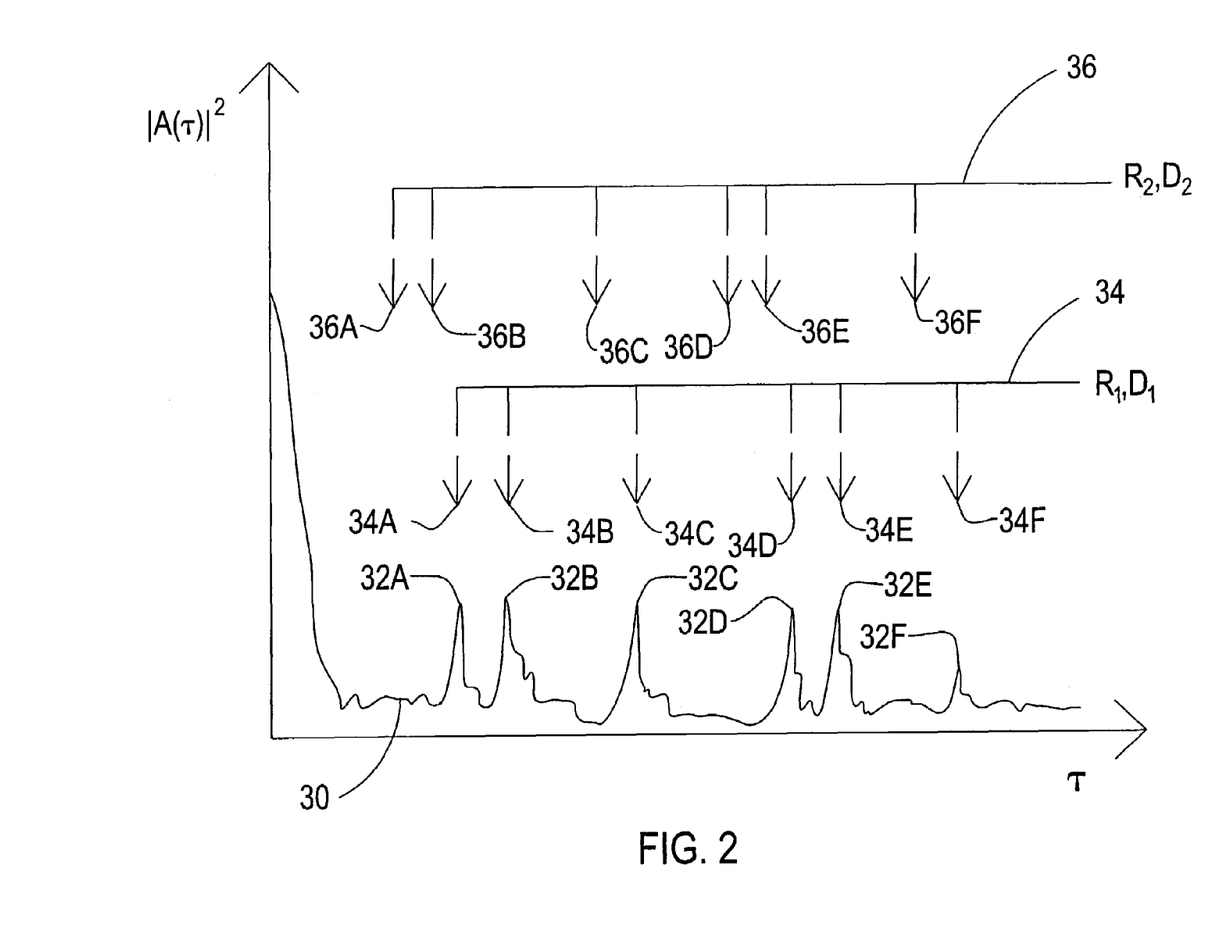
FIG. 2 is a graph of a representative squared autocorrelation function versus delay with indications of expected peak locations for two different hypothesized acoustical source locations.

In FIG. 2, range $R_1$ and depth $D_1$ give predicted peaks as shown by line 34 having predicted peaks 34A, 34B, 34C, 34D, 34E and 34F. Because peaks 32A-32F correspond to predicted peaks 34A-34F then $R_1$ and $D_1$ represent a good prediction. On the other hand, range $R_2$, and depth $D_2$, giving line 36 having predicted peaks 36A, 36B, 36C, 36D, 36E and 36F do not correspond with the actual peaks 32A-32F.

Figure 3:
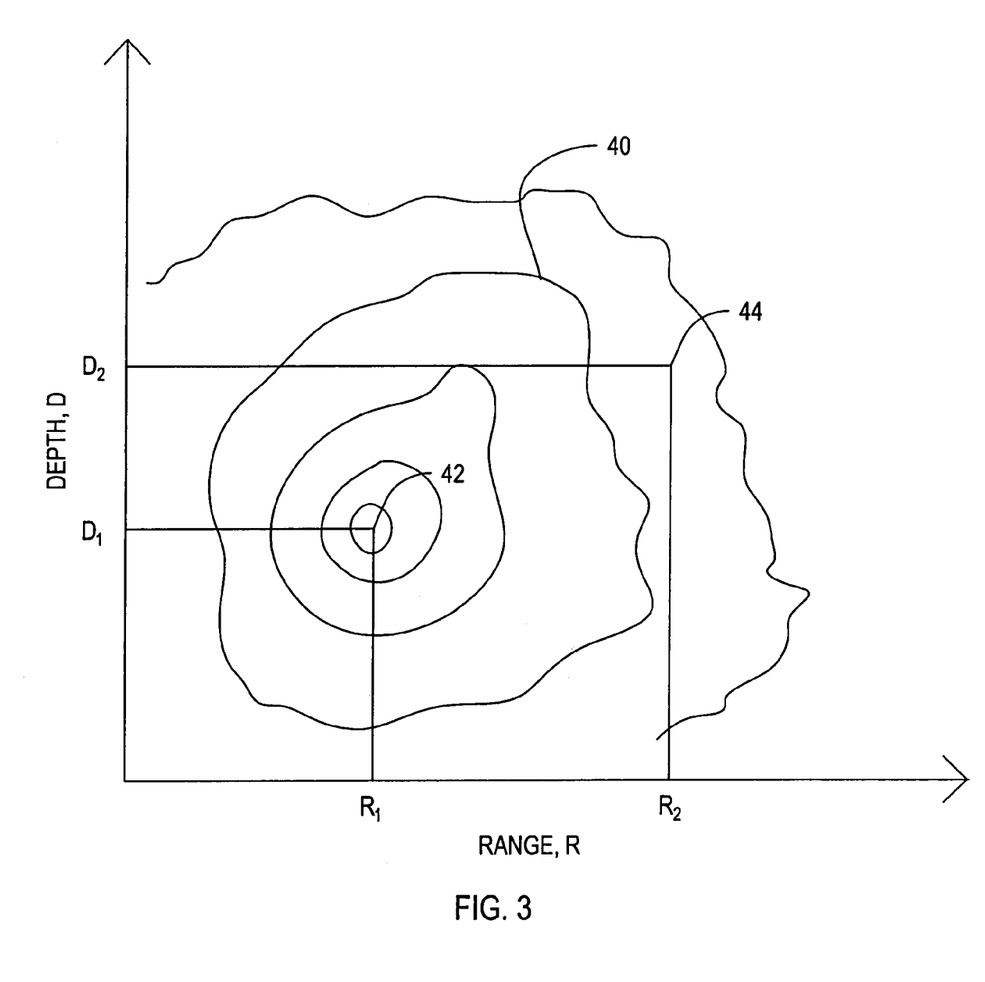
FIG. 3 is a contour plot of range versus depth for the acoustic power produced by the squared autocorrelation function of FIG. 1 with indications of expected locations for an acoustic power peak for two different hypothesized acoustical source locations.

In a preferred embodiment, the information about the autocorrelation peaks is combined into one piece of location information that is directly described in terms of range and depth as shown in FIG. 3. For the example of FIG. 2, the power in the six predicted locations shown in the graph may be nominally added to form one number. The squared, summed numbers are then displayed in a three dimensional or contour plot 40 as shown in FIG. 3, which describes acoustic power with respect to range and depth. We would normally expect the plot to peak at the location of a source (or sources) and not to peak where there is not a source. For example, from FIG. 2, we expect a peak at $(R_1,D_1)$ point 42 in FIG. 3 but no peak at $(R_2,D_2)$ point 44 in FIG. 3. Accordingly, FIG. 3 is a sketch of the contours of acoustic power with respect to range and depth that could be expected for the FIG. 2 autocorrelation (cepstrum) function 30. A display such as FIG. 3 gives the user an indication of the most likely location of the source while still indicating less likely locations.

To formulate the contour plot 40 of FIG. 3, the autocorrelation function, $|A(\tau)^2|$, is multiplied by a weighting function, $W_{R,D}(\tau)$, and integrated over all delay times, τ. The weighting function is developed from the predicted peaks at the likely range and depth as discussed below. The weighting function is explicitly a function of delay, τ, but implicitly, it is a function of the depth, D, and range, R, to a hypothetical source because the speed of sound is known from the environmental variables and the hypothetical distance can be calculated. Thus, the output of the post processing method of the present invention is a function of (R,D) as described below. In particular, we write that a source at range R and depth D would provide the power given by the equation:

$$P(R, D) = \int_0^\infty W_{R,D}(\tau)|A(\tau)|^2 d\tau \qquad (1)$$

While this equation shows a continuous integral, these calculations are typically performed using summations and other digital computation techniques.

For any particular hypothesized range and depth, there may be an uncertainty in abscissa location for the predicted auto correlation peaks. Thus, some inaccuracy may occur from simply adding, as per the present example, the six squared autocorrelation numbers. Instead, each weighting function would tend to be more complicated than six delta functions that depended on hypothesized range and depth. In one solution for this example, each weighting might consist of six "bell" shape pulses having to do with the anticipated strength and dispersion of the six correlation peaks shown in this example.

Figure 5A:
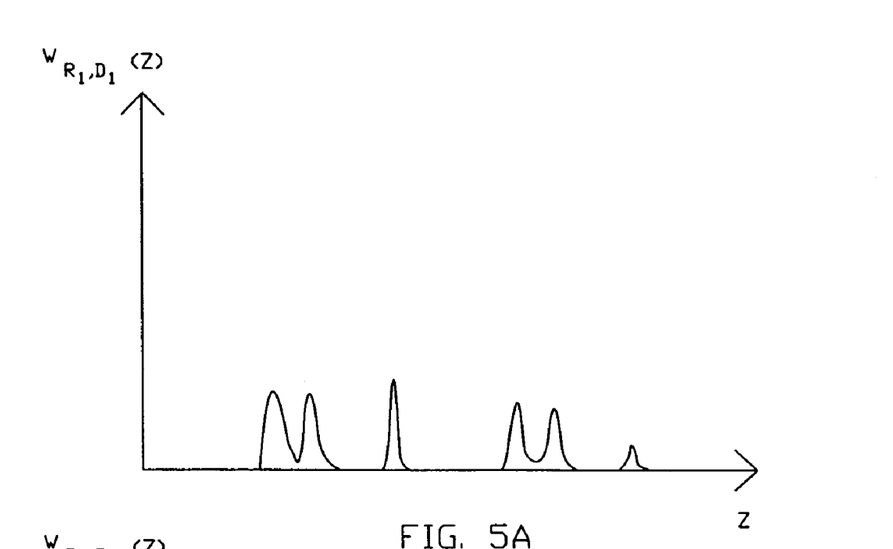
FIG. 5A is a graph of a possible weighting function versus delay for a first hypothesized acoustical source location.
Figure 5B:
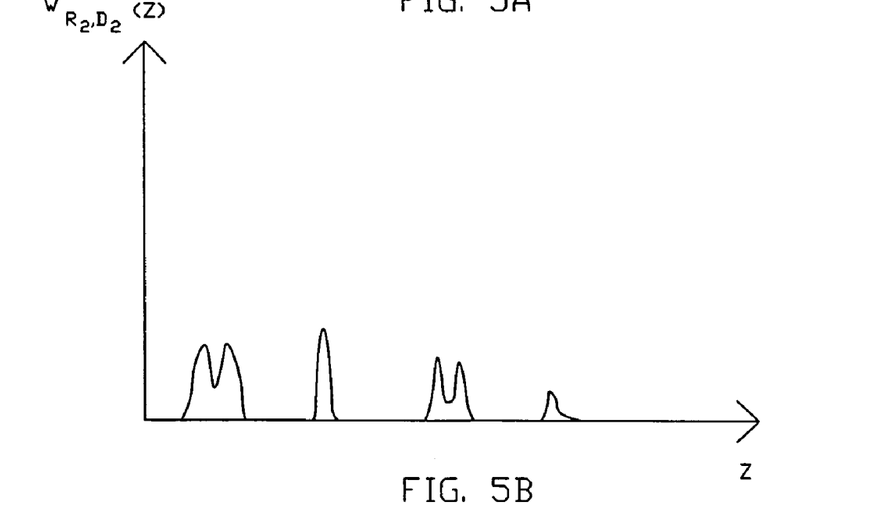
FIG. 5B is a graph of another possible weighting function versus delay for a second hypothesized acoustical source location.

As an example, two possible weighting functions plotted in FIGS. 5A and 5B which correspond, at least nominally, to the predicted autocorrelation peaks as indicated at 34 and 36 in FIG. 2. It will be noted that, while in FIG. 2 the strength of the third peak is greatest, this does not imply this peak or any other peak is always more important. It is merely intended to illustrate that different peaks can be given different weights in a general scheme.

To obtain the weighting function, accurate sound velocity profile (SVP) information is required as well as accurate ocean depth and slope information. It is also desirable to compute ray traces or the normal mode equivalent for a matrix of hypothesized depths and ranges. Under normal operating conditions, this computation could be made once a day or more often if the SVP or ocean depth changes. Thus, for 11 depths, 0 to 300 meters in 30 meter increments, and for 21 ranges 0 to 20 kilometers in 1 km increments calculation of the hypothesized depth and range matrix requires at least 231 ray trace sets periodically. It will be appreciated that the available computing time provides a limit of to the resolution that can be obtained.

Accordingly, in the present invention the autocorrelation (or cepstrum) function is condensed into its fundamental parameters range, R, and depth, D. The condensation is accomplished by squaring, weighting and integrating the autocorrelation function for a variety of (R,D) dependent weightings. The selection of the weightings is accomplished by ray tracing predictions based on measured oceanographic conditions sound velocity profile (SVP) ocean depth, ocean floor slope and ocean floor roughness. While this weighting would be expected to be a series of impulses necessary to rake through the autocorrelation function, in one possible embodiment the impulses may be smeared or spread out to make the technique more robust in the face of measurement uncertainty.

The present invention provides a sonar operator a useful display to assist in resolving multiple sources. The present invention reduces operator interaction and reduces the problem of determining range and depth to fundamental parameters to be measured. The present invention also displays inherent data ambiguities as discussed hereinafter.

In one embodiment, the present invention permits the sonar operator to be presented with a simple display that does not require operator interactive identification of which peaks correspond to which paths. Multiple (N) sources (targets) will give rise to multiple (N) peaks in the R, D plane of FIG. 3, so that the operator does not have to identify which peaks correspond to which targets.

However, in general, the R, D contour display may vary with time (as well as bearing), and therefore fades of individual autocorrelation peaks may be expected. The extent to which these fades or missing peaks result in a faded or ambiguous solution will be apparent on the display. For example, the possibility of a single delay could occur due to surface target 18 radiating energy received on a submerged sonar receiving array as per the situation shown in FIG. 4. In this case, the sonar receiving array would receive energy from the bottom path 18 and bottom-surface path 20. The peak is then due to the time delay difference in the arrival between the bottom path 18 and bottom-surface path 20.

Figure 4:
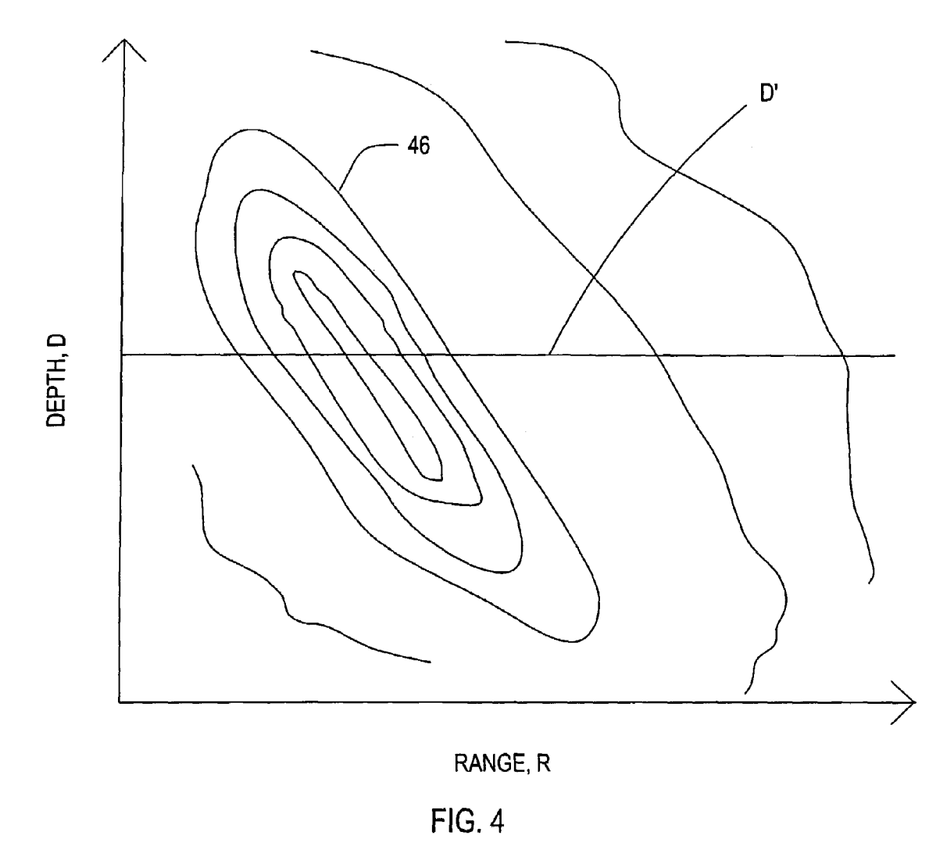
FIG. 4 is a graph of range versus depth which shows a ridge of uncertainty due to fading correlation peaks.

However, in a fading situation, there are other (submerged) targets that could give rise to this correlation peak. Hence, there is an inherent ambiguity in a single peak which may be (and preferably is) displayed to the operator in the present method by a contour plot 46 in the form of a ridge in the (R,D) display. An example of ridge of uncertainty due to fading correlation peaks is shown in FIG. 4. The ambiguity can be resolved if one knows (or assumes) a depth as indicated by line D'. The fact that the method displays an ambiguous solution is not a fault of the method and may be advantageous because it is a reflection of the fact that sources at other locations could possibly give rise to the observed correlation peak(s).

The method may also attach some significance to several weak (but present) autocorrelation (cepstrum) peaks. If peaks are not present in the autocorrelation (or cepstrum) function, all multipath methods, including the present method, will fail. It will also be understood that variations in the computational methods of the present invention may be utilized. For instance, an alternative, more computational, method for achieving the desired results may utilize matched field processing.

Accordingly, many additional changes in the details, components, steps, algorithms, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for determining a likelihood that a sonar signal originated from a range and depth comprising:
    calculating at least one environmentally modeled acoustic signal being radiated from at least one hypothetical range and depth;
    passively receiving a sonar signal having an unknown range and depth; and
    correlating said passively received sonar signal with said at least one environmentally modeled acoustic signal to determine the likelihood that said passively received sonar signal originated from the hypothetical range and depth as a function of range and depth utilizing autocorrelation peaks which are combined to produce a graph of acoustic power with respect to range and depth.

2. The method of claim 1, wherein said step of calculating said at least one environmentally modeled acoustic signal further comprises:
    collecting environmental data including ocean depth information, ocean floor information, and sound velocity profile information; and
    computing a plurality of ray traces for the at least one hypothetical range and depth.

3. The method of claim 1, wherein said step of calculating said at least one environmentally modeled acoustic signal further comprises producing a weighting function based on at least one hypothetical range and depth.

4. The method of claim 3 further comprising utilizing the following equation:

$$P(R, D) = \int_0^\infty W_{R,D}(\tau)|A(\tau)|^2 d\tau$$

where:
R is the range to the acoustically radiating source,
D is the depth to the acoustically radiating source,
$\tau$ is a time delay, and
$W_{R,D}(\tau)$ is the produced weighting function; and
P(R,D) provides the determined likelihood as a function of range and depth.

5. The method of claim 1 further comprising assuming a depth of said acoustically radiating source for resolving an uncertainty.

6. A method for estimating a range and a depth of an acoustically radiating source, comprising:
    producing an autocorrelation function, $A(\tau)$, from a beam output of an acoustic array produced in response to said acoustically radiating source;
    measuring acoustic environmental characteristics;
    producing a weighting function based on a matrix of hypothesized depths and ranges using measured acoustic environmental characteristics; and
    combining said autocorrelation function and said weighting function into one acoustic power measure suitable for display in terms of range and depth.

7. The method of claim 6 further comprising utilizing the following equation:

$$P(R, D) = \int_0^\infty W_{R,D}(\tau)|A(\tau)|^2 d\tau$$

where:
R is the range to the acoustically radiating source,
D is the depth to the acoustically radiating source,
$\tau$ is a time delay, and
$W_{R,D}(\tau)$ is the calculated weighting function; and
P(R,D) is the combined autocorrelation function and weighting function for display.

8. The method of claim 6 further comprising assuming a depth of said underwater acoustically radiating source for resolving an uncertainty.

9. A method for estimating the range and depth to an acoustic source comprising:

receiving sonar signals from the acoustic source at an array of sensors;

beamforming the received sonar signals to provide a beam output;

autocorrelating said beam output to produce a squared autocorrelation function, $|A(\tau)|^2$;

assuming at least one range and depth to the acoustic source;

collecting environmental data including at least depth and sound velocity profile;

predicting autocorrelation peaks based on environmental data for the assumed at least one range and depth; and comparing predicted autocorrelation peaks with said squared autocorrelation function to determine if the acoustic source is near the assumed range and depth.

10. The method of claim 9 wherein said step of comparing comprises:

calculating a weighting function from said predicted autocorrelation peaks; and combining said weighting function with said squared autocorrelation function to provide a function giving the likelihood that the acoustic source is near the assumed range and depth.

11. The method of claim 10 wherein said function giving the likelihood is displayed on a contour plot graph.

12. The method of claim 9 wherein:

said step of assuming comprises assuming a plurality of ranges and depths for the acoustic source;

said step of predicting autocorrelation peaks comprises predicting autocorrelation peaks for each assumed range and depth; and said step of comparing compares each set of predicted autocorrelation peaks with said squared autocorrelation function.

13. The method of claim 9 wherein said step of predicting autocorrelation peaks includes ray tracing a plurality of paths from the assumed at least one range and depth.

* * * * *